March 4, 1969
J. W. SAVAGE
3,431,487
CURRENT PROBE WITH AUXILIARY WINDING FOR
UNWANTED SIGNAL REJECTION
Filed Feb. 13, 1967
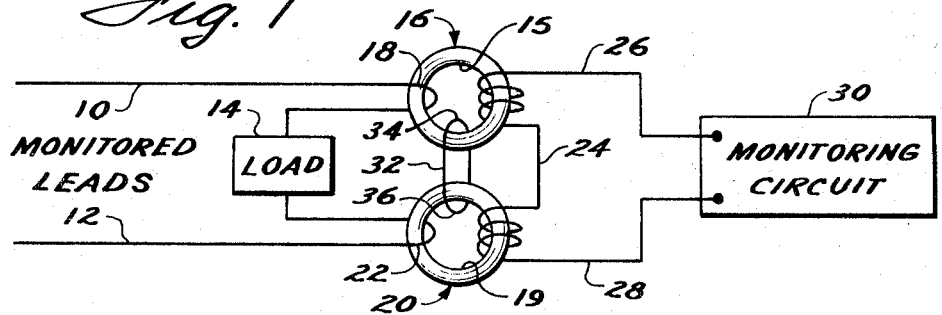
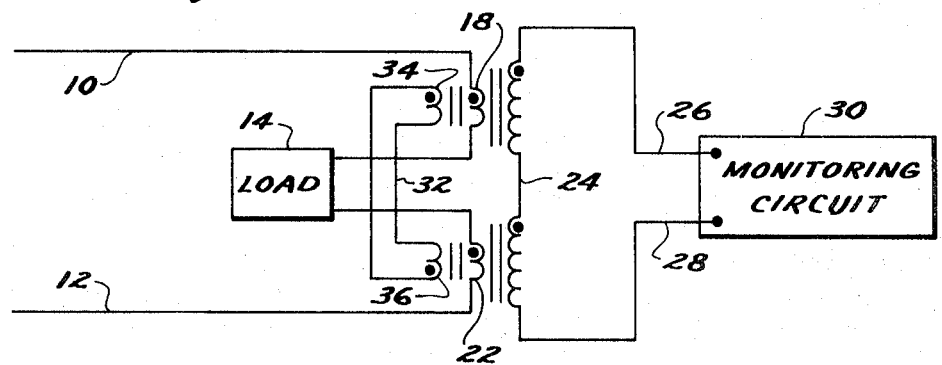
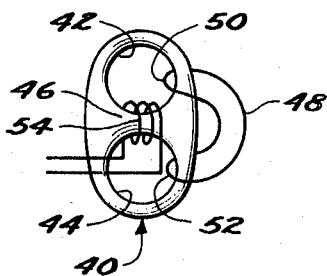
INVENTOR
JOHN W. SAVAGE
BY *Tipton D. Jennings*
ATTORNEY

United States Patent Office 3,431,487
Patented Mar. 4, 1969

3,431,487
CURRENT PROBE WITH AUXILIARY WINDING FOR UNWANTED SIGNAL REJECTION
John W. Savage, Bethesda, Md., assignor to The Susquehanna Corporation, a corporation of Delaware
Filed Feb. 13, 1967, Ser. No. 615,818
U.S. Cl. 323—50      7 Claims
Int. Cl. H02m 5/12

ABSTRACT OF THE DISCLOSURE

A specific example of the current probe is a transformer device which uses two ferrite torroidal cores, wound with a common secondary. Each core aperture is designed to be threaded by one wire of a conductor pair, and each wire serves as the transformer primary at its core. Common-mode currents through the two leads generate canceling EMF's in the secondary while differential currents generate adding EMF's. To overcome, in practice, the fact that measurable currents are derived at the secondary during the presence of common-mode currents, the two cores are looped by an additional wire. During the presence of common-mode currents, this wire carries a circulating current causing each primary to see essentially a zero impedance. As a result, essentially no voltage is developed across the secondary.

BACKGROUND OF THE INVENTION

Field of the invention

This invention relates to a current probe and, more particularly, to a probe for monitoring current in leads of an electrical circuit.

In certain circuit applications it becomes necessary to monitor the electrical leads to detect the presence of low values of radio-frequency current induced by stray electromagnetic fields. If the RF current is induced in each of two leads in a direction which causes current flow in each lead toward the load, the currents, frequently termed common-mode currents or antenna-mode currents, cancel and there is no net current flowing through the load. However, if current is induced in one lead toward the load and in the other lead away from the load, it results in a current through the load which is termed a differential current. In radio equipment, such current can be detrimental to operation; in electro-explosive devices this current can cause inadvertent explosions. It is necessary, therefore, to have a monitoring device which will detect the presence of a differential current but which will disregard common-mode current.

Description of the prior art

A common form of current probe comprises a ferrite torroidal core upon which is formed a multi-turn output winding. The conductor to be monitored is passed through the opening of the torroidal core and forms a single-turn primary. The core with its two windings acts as a current transformer. One method of monitoring differential current using this core is to pass both input leads through the single opening of the core. The output of the secondary then represents the vector sum of the currents through the two input windings. The torroidal core must, of course, have an opening large enough to receive the two conductors, which necessitates a core of such size that it is unsuitable for applications where space is limited.

A second method of monitoring the differential current in two input leads is to utilize two torroidal cores and to pass one input lead through each. The output from the two torroidal cores is then vectorially summed. Such a method requires two sets of output equipment, one attached to each core and additional equipment to perform the vector summation. A third method is to physically locate the two torroidal cores adjacent to each other and to utilize a commonly wound output winding. While this method eliminates the requirement for complex output equipment, it is still not satisfactory for many precision operations because of dissimilarities in the characteristics of the two cores and the difficulty in winding the secondary identically on both cores. As a consequence, this type of differential current probe gives erroneous readings.

SUMMARY OF THE INVENTION

It is an object of the present invention to provide an improved current probe.

It is also an object of the present invention to provide an improved RF current probe in which undesired output signals are minimized or eliminated.

It is another object of the present invention to provide an improved current probe capable of accurately monitoring differential current while rejecting common-mode current in conductors.

These and other objects and advantages are obtained in the present invention by means of a current probe which utilizes two ferrite torroidal cores that have wound upon them a common multi-turn output winding and a shorted, single-turn, auxiliary winding which loops both cores. The effect of the auxiliary winding is that in the presence of common-mode currents, a circulating current is induced therein which causes a near-zero impedance at each primary. Little or no voltage is developed across the primaries and therefore little or no current is induced in the output winding. What little current is induced is out of phase and cancels.

BRIEF DESCRIPTION OF THE DRAWING

A further understanding of the subject invention will be obtained from the following detailed description and claims when considered in conjunction with the accompanying drawings, wherein:

FIGURE 1 is a representation, partly in block diagram and partly in schematic diagram form, of a preferred embodiment of the subject invention;

FIGURE 2 is a schematic diagram of the subject invention shown in FIGURE 1; and

FIGURE 3 shows an embodiment of a ferrite core which can be used in the subject invention.

DESCRIPTION OF THE PREFERRED EMBODIMENTS

With reference to FIGURES 1 and 2, conductors 10 and 12 are the input leads which connect load 14 to other circuitry such as a prior electronic stage or a power supply (not shown). The particular circuitry to which load 14 is connected is not necessary to an understanding of the subject invention. Input lead 10 passes through the opening 15 of ferrite torroidal core 16, forming single turn 18, and input lead 12 passes through the opening 19 of ferrite torroidal core 20, forming single turn 22. Output winding 24 forms a plurality of turns on both core 16 and core 20, providing a secondary at each core. Winding 24 terminates in output leads 26 and 28 which connect it to monitoring circuit 30. Monitoring circuit 30 can be of any design which will permit the reading of the current induced in winding 24. By way of example, circuit 30 can be a simple resistor network in which measurement of the voltage developed across the resistor network provides an indication of the current induced in winding 24.

A single auxiliary loop 32 threads the central openings 15 and 19 in the cores 16 and 20, respectively. This loop 32 forms a single-turn winding 34 about core 16 and a single-turn winding 36 about core 20.

In practice, one successful construction technique has been to place the cores 16 and 20 in a side-by-side abutting relationship and wind the output winding 24 commonly on both cores about the abutting point.

In operation, assume that an induced RF current flows into lead 10, through the load 14 and out on lead 12. This is a differential current, previously described, that it is desired to detect by the present invention. As shown by the polarity dots in FIGURE 2, primary windings 18 and 22 and the output winding 24 are arranged on the cores in an aiding or in-phase orientation for a differential current. The current through each of windings 18 and 22 generates fluxes in the two cores 16 and 20, respectively, which induce aiding currents in output winding 24. The net current is passed to monitoring circuit 30, and the presence of the differential current is thereby detected and its value determined.

The loop 32 is shown by the polarity dots to be wound on one core in an opposing or out-of-phase orientation relative to the other windings and in-phase on the other core. In the presence of the differential current, the flux created in core 16 by winding 18 and the flux created in core 20 by winding 22 induces opposing currents in the loop 32 which cancel and thereby have no effect on output winding 24. For example, with reference to the windings in FIGURE 2, a current flowing downwardly in winding 18 induces a downward current in winding 34. In winding 22, the same downward direction of the differential current induces an upward current in winding 36 because this latter winding is wound with opposite polarity with respect to primary 22. In loop 32, the induced currents oppose and cancel.

Assume next that an RF current is induced on each of the two leads 10 and 12 towards load 14. These are the common-mode currents, previously described, which the present invention prevents from affecting the monitoring circuit 30. Assuming first that loop 32 is absent, the current through winding 18 and the current through winding 22 generate fluxes in cores 16 and 20, respectively, which induce opposing currents in the output winding 24. These currents would theoretically cancel. However, in practice, it has been found that these two induced currents do not entirely cancel, resulting in some current reaching the monitoring circuit 30. The cause may be due to differences in the geometry of cores 16 and 20 or the windings on these cores, or to slight phase differences between the signal at each primary winding. Whatever the cause, a signal is received at the monitoring circuit.

The addition of the auxiliary winding 32 results in a reduction or elimination of current flow from the secondary during the presence of common-mode currents. With reference to FIGURE 2, current flowing downwardly through primary 18 induces a downward current in winding 34, and an upward current in primary winding 22 induces a downward current in winding 36. In loop 32 these two induced currents add to create a circulating current within this loop. This circulating current causes each primary 18 and 22 to see a short-circulated winding, and accordingly a near-zero impedance is experienced at each primary. With the impedance near zero, essentially no voltage can be developed across the primaries and no current is induced in winding 24. Any currents that might be induced would be very small in value and of course would still oppose one another and tend to cancel. Should any small current be transformed and not entirely canceled, the uncanceled portion would be of negligible value and have little effect on monitoring circuit 30.

FIGURE 3 depicts embodiment of a unitary ferrite core which can be used in the current probe of the subject invention. The core 40 is provided with two apertures 42 and 44 which are spaced apart to form a bridge 46. Auxiliary winding 48 threads apertures 42 and 44, forming a single-turn winding 50 at aperture 42, and forming another single-turn winding 52 at aperture 44. The multi-turn secondary winding 54 is wound through apertures 42 and 44 about bridge 46. One input lead (not shown) is passed through each aperture. Loop 48 is threaded through apertures 42 and 44 in such a polarity orientation as to aid in the rejection of common-mode currents, as discussed above.

The current probe can, of course, be used to monitor common-mode currents while rejecting differential currents, if such an application is desired. One manner of accomplishing this is to pass either input lead 10 or 12 through its corresponding core 16 or 20 with a polarity orientation opposite that depicted in FIGURE 2, so that common-mode currents result in net current flow in output winding 24 together with canceling currents in auxiliary winding 32. Accordingly, differential currents are rejected by the invention due to the effect of the circulating currents formed in winding 32, which effect is described more fully above.

The diameter of the auxiliary winding is preferably kept small relative to the size of the input leads, and the size of the core need not be appreciably increased. While the present invention has been described with respect to the RF frequencies, higher and lower frequencies can be accommodated by selection of the core characteristics, secondary turns, and the like to obtain the desired frequency response. For higher frequencies it may be desirable to provide several, individual, auxiliary loops to insure effective lowering of the impedance at the primaries in the presence of common-mode currents, and thereby prevent transformation of those signals to the secondary, and also prevent adverse effects on the monitored circuit which might result were significant impedance inserted in series with the common-mode currents.

Although the present description has been with respect to illustrative embodiments, it is recognized that modifications may be made without departing from the basic teaching of the invention. Accordingly, the scope of the invention is intended to include all embodiments falling within the scope of the claims.

What is claimed is:

1. A current probe comprising core means having a plurality of apertures, each aperture adapted to receive a current conductor and an output winding formed on said core means, wherein the improvement comprises an auxiliary winding formed on said core means, said auxiliary winding passing through all of said apertures, and having a predetermined polarity orientation with respect to each current conductor when said current conductors are received by said apertures to permit first currents in predetermined directions through said current conductors to induce currents in said output winding and prevent second currents in different predetermined directions through said current conductors from inducing any substantial currents in said output winding.

2. A current probe as claimed in claim 1 wherein said core means is formed of two ferrite cores and each core has an aperture, and wherein said auxiliary winding passes through the aperture in each core.

3. A current probe as claimed in claim 1 wherein said core means is of unitary construction and has two apertures formed therein, said apertures being separated by a bridge of said core, said output winding being wound on said bridge and wherein said auxiliary winding passes through said two apertures in said unitary core.

4. A current probe as claimed in claim 2 wherein said auxiliary winding is a single loop which forms one turn on each core.

5. A current probe as claimed in claim 3 wherein said auxiliary winding is a single loop which forms one turn on each core.

6. A current probe as claimed in claim 2 wherein said auxiliary winding has a polarity orientation with respect to each current conductor which is received in each aperture to permit differential currents in said conductors to induce currents in said output winding and prevent common-mode currents from inducing any substantial currents in said output winding.

7. A current probe as claimed in claim 2 wherein said auxiliary winding has a polarity orientation with respect to each current conductor which is received in each aperture to permit common-mode currents in said conductors to induce currents in said output winding and prevent differential currents from inducing any substantial currents in said output winding.

References Cited

UNITED STATES PATENTS 2,779,908   1/1957   Martin _____ 323—50

JOHN F. COUCH, *Primary Examiner.*

G. GOLDBERG, *Assistant Examiner.*

U.S. Cl. X.R.

323—85; 324—127; 336—73